(12) United States Patent
Laue et al.

(10) Patent No.: US 7,331,599 B2
(45) Date of Patent: Feb. 19, 2008

(54) DEVICE FOR CONNECTION OF AN AIRBAG MODULE TO A SUPPORTING VEHICLE COMPONENT

(75) Inventors: Andreas Laue, Elsenfeld (DE); Hong Hodac, Niedernberg (DE)

(73) Assignee: Takata-Petri AG, Ashaffenburg (DE)

( * ) Notice: Subject to any disclaimer, the term of this patent is extended or adjusted under 35 U.S.C. 154(b) by 0 days.

(21) Appl. No.: 11/539,818

(22) Filed: Oct. 9, 2006

(65) Prior Publication Data
US 2007/0075527 A1 Apr. 5, 2007

Related U.S. Application Data

(63) Continuation of application No. PCT/DE2005/000646, filed on Apr. 6, 2005.

(30) Foreign Application Priority Data
Apr. 8, 2004 (DE) .................. 20 2004 005 994 U

(51) Int. Cl.
*B60R 21/16* (2006.01)
(52) U.S. Cl. .................................... 280/728.2; 280/731
(58) Field of Classification Search ................ 280/731, 280/728.2, 728.1, 743.1; 24/662, 453; 411/508, 411/46, 510
See application file for complete search history.

(56) References Cited

U.S. PATENT DOCUMENTS

| 5,333,897 | A | | 8/1994 | Landis et al. | |
|---|---|---|---|---|---|
| 5,380,037 | A | * | 1/1995 | Worrell et al. | 280/728.2 |
| 5,630,611 | A | * | 5/1997 | Goss et al. | 280/728.2 |
| 6,036,223 | A | * | 3/2000 | Worrell et al. | 280/731 |
| 6,082,758 | A | * | 7/2000 | Schenck | 280/728.2 |
| 6,688,638 | B2 | * | 2/2004 | Schutz | 280/728.2 |
| 6,695,343 | B1 | | 2/2004 | Christiansen et al. | |
| 6,827,367 | B1 | | 12/2004 | Frisch | |
| 2002/0125698 | A1 | | 9/2002 | Schutz | |
| 2004/0041372 | A1 | | 3/2004 | Helmstetter | |
| 2004/0041373 | A1 | | 3/2004 | Helmstetter et al. | |

FOREIGN PATENT DOCUMENTS

DE 101 55 856 A1 6/2002
DE 202 12 144 U1 2/2003

(Continued)

*Primary Examiner*—Paul N. Dickson
*Assistant Examiner*—Tiffany L. Webb
(74) *Attorney, Agent, or Firm*—Fitch, Even, Tabin & Flannery

(57) ABSTRACT

The invention relates to a device for connection of an airbag module to a supporting vehicle component, comprising an expanding element, arranged on one of the modules for connection, a clip opening, provided on one of the other modules for connection, and into which the expanding element may be introduced such as, in a clipping position in the expanded state, to engage behind the edge of the clip opening and a security element which may be engaged with the expanding elements such as to retain the expanding element in the expanded state. According to the invention, the security element, before being engaged with the expanding element, is detachably connected to a component of the module, provided with the expanding element and arranged behind the clip opening such as to be able to be brought into engagement with the expanding element when the latter is run through the clip opening over the clip position thereof.

30 Claims, 7 Drawing Sheets

FOREIGN PATENT DOCUMENTS

| | | |
|---|---|---|
| DE | 203 00 171 U1 | 7/2003 |
| EP | 1 057 697 A2 | 12/2000 |
| EP | 1 101 661 A2 | 5/2001 |
| EP | 1 245 462 A2 | 10/2002 |
| WO | WO 00/13943 | 3/2000 |

* cited by examiner

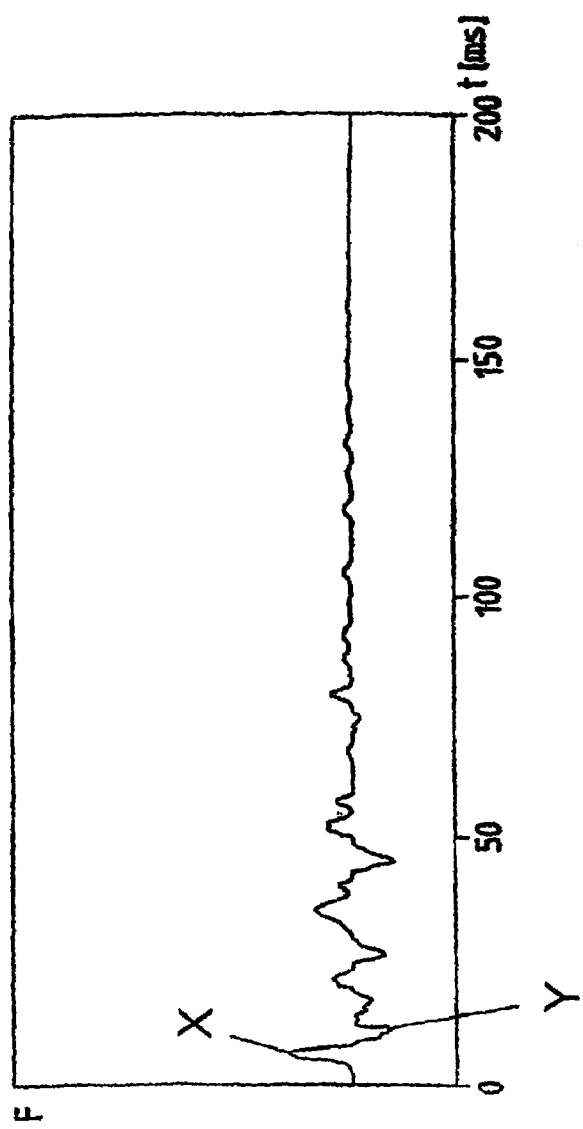

DEVICE FOR CONNECTION OF AN AIRBAG MODULE TO A SUPPORTING VEHICLE COMPONENT

CROSS REFERENCE TO RELATED APPLICATIONS

This is a continuation application of prior application number PCT/DE2005/000646, filed Apr. 6, 2005 and claims the benefit under 35 U.S.C. § 119 of prior foreign application number DE 20 2004 005 994.0, filed Apr. 8, 2004, which are hereby incorporated herein by reference in their entirety.

FIELD OF THE INVENTION

The invention relates to a device for connection of an airbag module to a supporting vehicle component.

BACKGROUND OF THE INVENTION

A device of this type comprises an expanding element which is arranged on one of the two subassemblies to be connected; a latching opening which is provided on the other of the two subassemblies to be connected and into which the expanding element can be introduced in such a manner that, after being introduced into the latching opening, it can take up a latching position, in which in the expanded state it engages behind the edge of the latching opening; and a securing element which can be brought into engagement with the expanding element in such a manner that it secures the expanding element in the expanded state, in which the latter engages behind the edge of the latching opening. A latching connection of this type between an airbag module and an associated supporting vehicle component, for example a steering wheel, has the advantage that it can be produced very simply by the two subassemblies which are to be connected to each other being plugged together, with at least one expanding element on the one subassembly being introduced into at least one latching opening of the other subassembly and, in the process, being radially compressed, so that it can be guided through the latching opening, and subsequently widens again radially, so that there is a form-fitting connection (latching connection) between the two subassemblies to be connected to each other. However, latching connections of this type on the basis of an expanding element have the disadvantage that, when very high forces occur at the connecting points, there is a certain risk that the connection will be released (by deformation of the expanding element). Such forces may occur at the connecting points between an airbag module and a supporting component of a vehicle body, for example a steering wheel, in particular if, as a consequence of a sharp deceleration of the vehicle, i.e. a what is referred to as a crash event, the airbag module is triggered and the airbag of the airbag module is inflated within milliseconds in order to protect a vehicle occupant, in which case a corresponding recoil occurs.

In order to prevent an unintentional release of the connection between the airbag module and an associated supporting vehicle component, it is known to bring a securing element into engagement with the expanding element, said securing element holding the expanding element in the expanded state by engaging behind the edge of the associated latching opening. However, this securing of the connection between a particular expanding element and an associated latching opening has the disadvantage that an associated securing element, for example in the form of a securing pin, has to be brought into engagement with the particular expanding element, which is a drawback to installation if access to the individual connecting points is difficult. Furthermore, this may also make disassembly of the connection considerably more difficult. This is because, on account of the securing element, it is not possible simply to release this connection by the expanding element being compressed at its expanding section and being moved through the latching opening, since the securing element holds and locks the expanding element in the expanded position. It is therefore necessary, when the connection is disassembled, for example for repair or service purposes, first of all to remove from each expanding element the securing element located there. If access to the airbag module in a motor vehicle is difficult, this makes the disassembly significantly more difficult.

SUMMARY OF THE INVENTION

The invention is based on the problem of further improving a device for the connection of an airbag module to a supporting vehicle component of a motor vehicle of the type mentioned at the beginning.

This problem is solved according to the invention by the provision of a device as described hereinafter.

According thereto, the securing element is originally connected releasably to a component which is different from the subassembly provided with the expanding element and, in the process, is arranged behind the latching opening in such a manner that it can be brought into engagement with the expanding element when the latter is guided beyond its latching position through the latching opening.

The invention is based firstly on the finding that the bringing of the expanding element into engagement with a respectively associated securing element can be simplified and automated if the respective securing element is already held behind the latching opening during installation, i.e. when the expanding elements are introduced into the respectively associated latching openings. By the respective expanding element being guided beyond its latching position through the associated latching opening, it can be brought into engagement with the associated securing element at a suitable time. When the expanding elements are moved back (in particular pulled back) into the respective latching position, the securing elements can then be detached from the respective component to which they are releasably fastened. Each securing element is then in permanent engagement with an associated expanding element and holds the latter in the expanded state.

Furthermore, the number of cases in which the airbag module and an associated supporting motor vehicle component has to be removed from each expanding element by taking out the respective securing element can be reduced if the expanding element can be introduced into the associated latching opening and can be fixed thereon in the latching position while the associated securing element is initially still being held ready for securing this connection. The engagement between a respective expanding element and the associated securing element is only produced here when the expanding element is moved beyond its latching position (for example in the event of a crash), so that it enters into engagement with the securing element and is thereby permanently expanded.

According to a variant of the invention, it is provided that, when the airbag module is installed on an associated supporting vehicle component, each expanding element is only guided through the associated latching opening until it is in its latching position, in which it engages in the expanded state behind the edge of the latching opening. This connection is not then secured by a securing element. In the case of this embodiment of the invention, a connection secured by the securing element only takes place between a respective expanding element and a latching opening in the event of a crash, in which the respective expanding element is moved beyond its latching position under the action of the recoil occurring on the airbag module when the airbag is inflated, and, in the process, grasps a securing element and carries along the latter during the return into its latching position after it has been released from the component to which it was initially releasably connected. In the case of this embodiment of the invention, the connection, produced by expanding elements and associated latching openings, between an airbag module and a supporting vehicle component is therefore only secured by additional securing elements if this connection is actually exposed to particular loads in the event of a crash.

According to another variant of the invention, the securing of the connection between airbag module and supporting vehicle component can also take place at a suitable time of the installation by the respective expanding element being moved beyond its latching position to an extent such that it grasps the associated securing element, which is connected releasably to a component, and is thereby held in the expanded state.

In both embodiments, it is preferably provided that the expanding element, when introduced into the latching opening, can be brought into a first position, which is referred to as the latching position and in which it engages in a form-fitting manner behind the edge of latching opening and bears against said edge, and that the expanding element can be brought beyond the latching position into a second position, which is referred to as the engagement position and in which it enters into engagement with the securing element in order to grasp the securing element, to be detached from the associated component and thus to fix the expanded state of the expanding element.

According to a preferred embodiment, the expanding element has a stem and an elastically compressible expanding section, the stem of the expanding element reaching through the latching opening, after the expanding element is introduced into the latching opening until it reaches a latching position, and the expanding section engaging behind the edge of the latching opening.

In this case, the stem of the expanding element is preferably of such a length that the expanding element can be brought (beyond its latching position) with respect to the latching opening into an engagement position, in which the stem of the expanding element reaches through the latching opening and the expanding section of the expanding element is spaced apart from the edge of the latching opening (in the axial direction, i.e. along the direction of extent of the latching opening), with it being possible, in the engagement position of the expanding element, for its expanding section to grasp the securing element which is still connected releasably to an associated component. Put another way, the extent of the stem in the direction of extent of the latching opening is greater than the extent of the latching opening itself in this direction. This gives rise to the possibility that the expanding element can be brought into different longitudinal positions with respect to the latching opening by the stem being displaced in the latching opening, with the expanding element bearing against the edge of the latching opening in one longitudinal position, referred to as the latching position, and engaging behind said latching opening in a form-fitting manner and, in another longitudinal position, referred to as the engagement position, the expanding element grasping the securing element, which is arranged behind the latching opening and is connected releasably to a component.

The two subassemblies to be connected to each other are elastically braced against each other, for example by means of at least one elastic element in the form of a spring (helical spring), in such a manner that the expanding element has the tendency, after being introduced into the latching opening, of taking up its latching position. The spring element, which is preferably designed as a helical spring, can engage here around the stem of the expanding element.

The transfer of the expanding element into its engagement position, in which it can grasp the securing element, which is arranged releasably behind the latching opening, follows in this case counter to the action of the elastic prestress between the two subassemblies, with the restoring action of this elastic prestress also leading to the respective expanding element being guided back into its latching position after grasping a securing element (with the securing element being taken along).

The two subassemblies to be connected to each other may be, for example, firstly a component of the module housing of an airbag module, for example a receptacle for an airbag to be inflated and for a gas generator, and, secondly, a component of a steering wheel, such as, for example, a what is referred to as a contact bridge which serves to trigger a signal horn which can be actuated on the steering wheel. The signal horn can be actuated, for example, by the airbag module being displaced, by force being applied to its covering cap, relative to the contact bridge counter to the action of an elastic element and acting on said contact bridge, with mutually assigned electric contact elements entering into contact and triggering the signal horn. The force typically associated with the actuation of the signal horn (by action upon the cap of the airbag module by means of the particular driver's hand) here is not to be of such a magnitude that a movement of the airbag module relative to the contact bridge is brought about in an extent in which the expanding elements provided on the airbag module could enter into engagement with the associated securing element located behind the respective latching opening—at least if such an engagement is only to be produced, according to the invention in the event of a crash by the corresponding larger recoil force which then acts on the airbag module.

The securing element is preferably formed in a simple manner on the component, to which it is releasably connected, by injection molding. That component is preferably a component of the subassembly which is provided with the at least one latching opening.

In order to permit a defined detachment of the securing element from the associated component when the securing element is grasped by an expanding element and the expanding element is moved back into its latching position under the action of a restoring spring, the releasable connection between the securing element and the associated component comprises at least one predetermined breaking point.

In order to be able to hold the securing element permanently in the expanding element and thus to ensure the permanent expansion of the expanding element, the expanding element has (on its expanding section) a form-fitting region, in particular in the form of an undercut contour, with which it can grasp the securing element in a form-fitting manner. Furthermore, a guide section, for example in the form of one or more guide surfaces with a conical profile, can be provided on the expanding element and/or the securing element in order to facilitate the bringing of the expanding element into engagement with the securing element. A corresponding guide section can also facilitate the introduction of the respective expanding element into an associated latching opening.

The expanding element can be formed, for example, by means of at least two hooks (separated from each other by a slot), so that it can be compressed when introduced into the latching opening and can be elastically widened again after the latching position is reached.

The connection between the airbag module and the supporting vehicle component preferably has (at least two) connecting points at which a respective expanding element is in engagement in a form-fitting manner with an associated latching opening.

A connection between two motor vehicle subassemblies, namely an airbag module and a supporting vehicle component, using a connecting device according to the invention, is one preferred embodiment.

BRIEF DESCRIPTION OF THE DRAWINGS

Further details and advantages of the invention will become clear in the description below of an exemplary embodiment with reference to the FIGS.:

FIG. 5 shows a graphical illustration of the forces acting on the connecting point in the event of a crash;

DETAILED DESCRIPTION OF THE PREFERRED EMBODIMENTS

Figure 1:
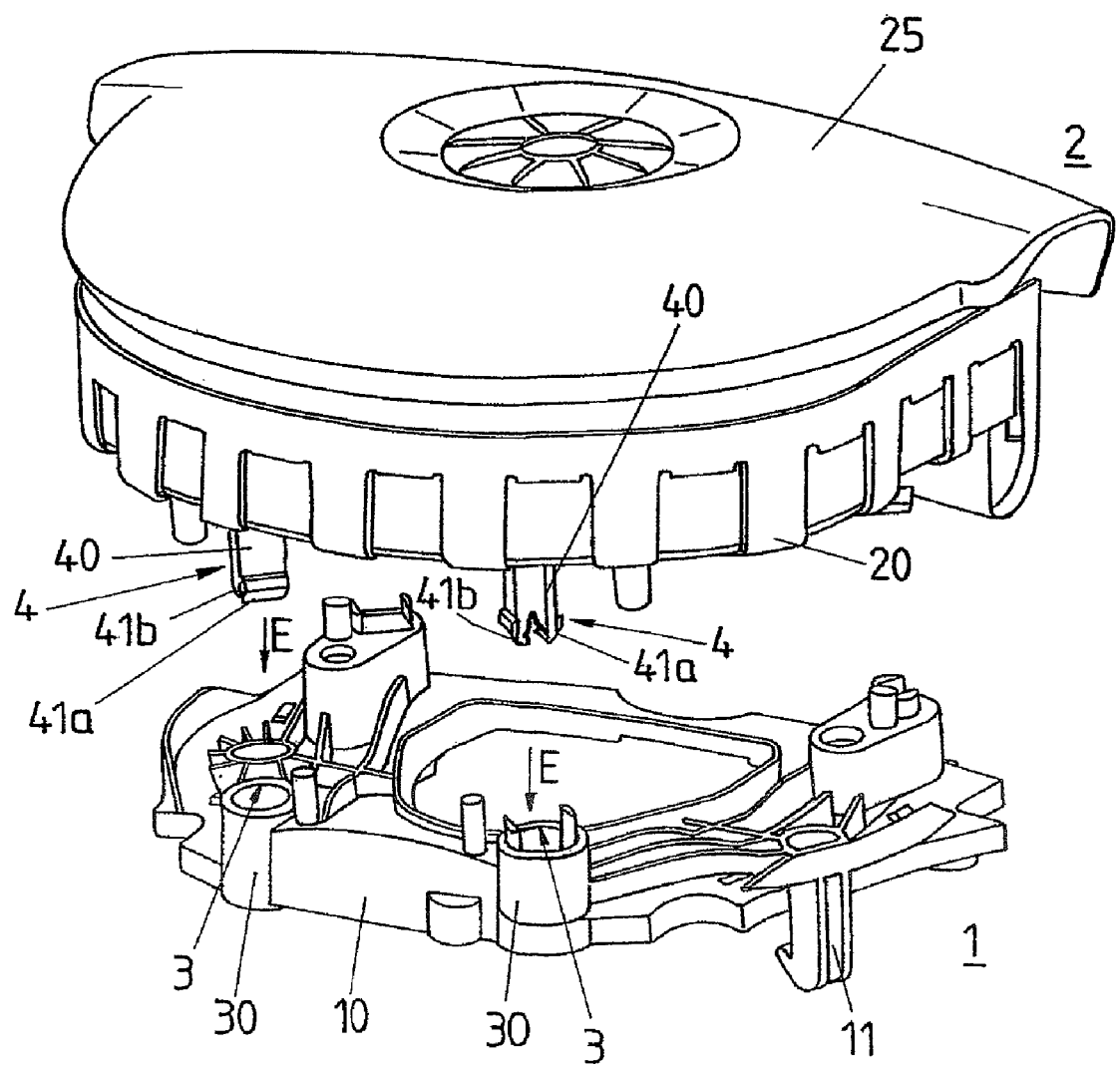
FIG. 1 shows a perspective illustration of an airbag module and a contact bridge of a steering wheel, to which the airbag module is to be connected.
Figure 2:
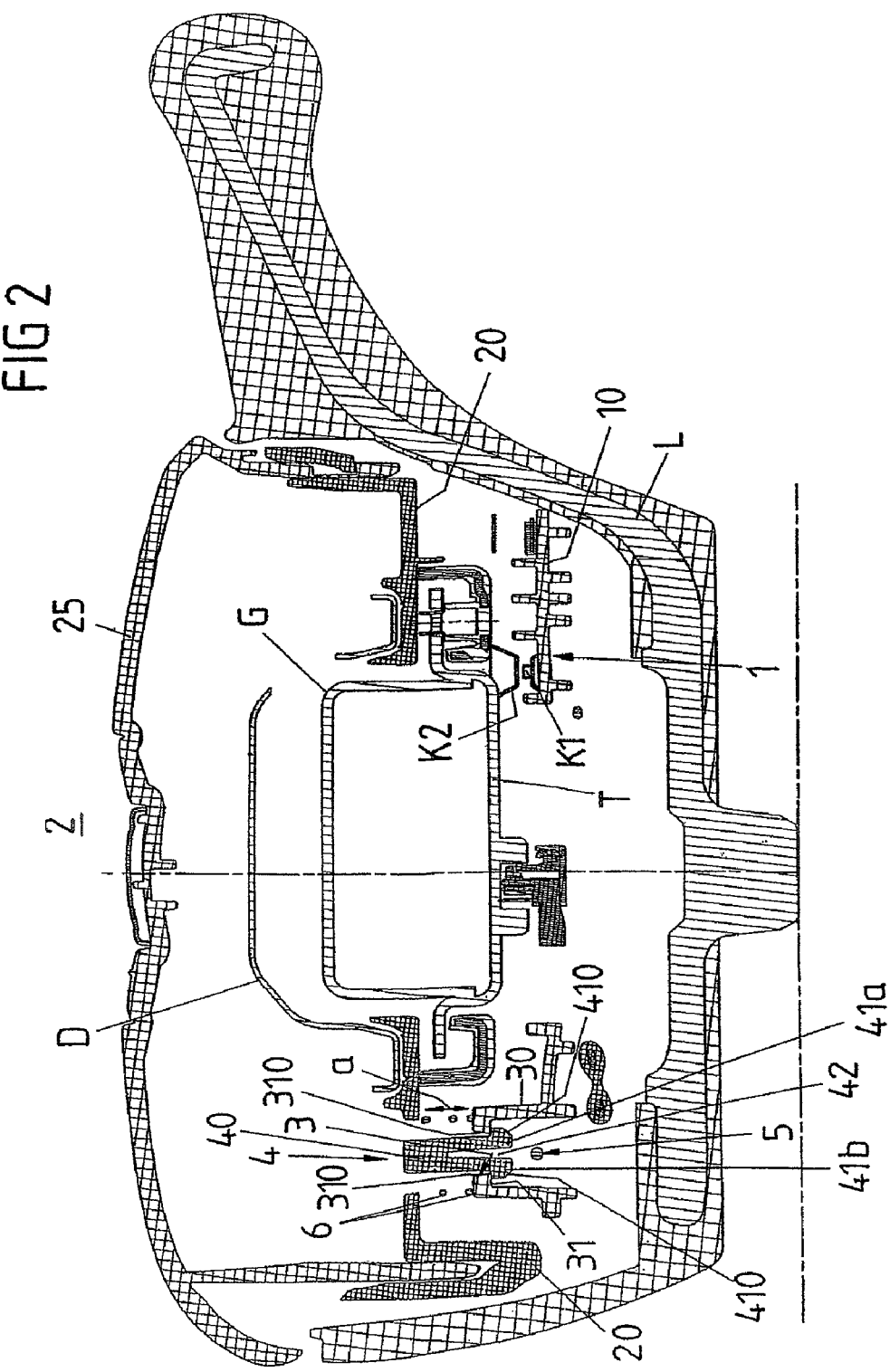
FIG. 2 shows a cross section through an arrangement according to FIG. 1 after production of the connection.

FIGS. 1 and 2 diagrammatically illustrate a contact bridge 1 which can be fastened to a steering wheel skeleton L and an airbag module which is to be connected (FIG. 1) or is connected (FIG. 2) to the contact bridge 1.

The contact bridge 1 comprises a basic body 10 with hooks 11 for fastening to the steering wheel skeleton L and with latching openings 3 in the form of passage openings on two hollow cylindrical latching bodies 30 provided on the basic body 10 of the contact bridge 1.

The airbag module 2 comprises a module housing, comprising a receptacle 20 for the gas generator G with generator carrier T, for an associated diffuser D and for an airbag to be inflated with the gas generator G, and a cap 25 for closing the receptacle 20. Two expanding elements 4 protrude from the module housing 20, 25 on the lower side of the receptacle 20 and are assigned in each case to one of the latching openings 3 on the contact bridge 1. The two expanding elements 4 each have a longitudinally extended stem 40 and an expanding section which is formed by two hooks 41a, 41b, which are separated from each other by means of a slot 42, and is prestressed elastically in the direction of the expanded state.

In order to install the airbag module 2 on the contact bridge 1, the two expanding elements 4 are introduced into the associated latching openings 3, with the introduction being facilitated by mutually assigned introducing slopes 310, 410 on the edge 31 of the latching opening 3 and on the expanding section 41a, 41b. When the expanding elements 4 are introduced into the associated latching openings 3 by movement of the airbag module 2 with respect to the contact bridge 1 along an introductory direction E (FIG. 1), the expanding sections 41a, 41b of the latching elements 4 are compressed radially inward, with use being made of the elastic deformability of the latching hooks which form the expanding section 41a, 41b and are separated from each other by a gap 42.

The expanding elements 4 have reached their latching position with respect to the latching openings 3 when the expanding sections 41a, 41b are passed through the respective latching opening 3 and engage in a form-fitting manner behind the edge 31 of the respective latching opening 3. This is achieved by the expanding sections 41a, 41b automatically expanding again radially after penetrating the respective latching opening 3. In this latching position, the expanding elements 4 each reach through the latching opening 3 by means of their stem 40.

In this case, the airbag module 2 and the contact bridge 3 are braced against each other via elastic means in the form of helical springs 6, which engage around the stem 40 of the respective expanding element 4, in such a manner that the respective expanding element 4 has the tendency to rest with its expanding section 41a, 41b on the edge 31 of the latching opening 3.

Furthermore, a securing element 5 in the form of a securing pin which is connected releasably to the contact bridge 1 is arranged behind a respective latching opening 3, within the hollow cylindrical latching body 30 forming the latching opening.

If a respective expanding element 4 is in its latching position in which it bears with its expanding section 41a, 41b against the edge 31 of the associated latching opening 3, then the securing element 5 is spaced apart from the expanding section 41a, 41b of the expanding element 4 in the axial direction a, i.e. the direction of extent of the latching opening 3 (perpendicular with respect to the area of the latching opening 3). Accordingly, in the state shown in FIG. 2, the airbag module 2 and the contact bridge 1 are connected to each other in a form-fitting manner via latching connections, formed by a respective expanding element 4 which engages in an associated latching opening 3, without the expanding elements 4 being permanently held in the expanded state by a securing element.

In normal operation of a motor vehicle, in which no particularly large forces act on said connecting points, a connection of this type between airbag module 2 and contact bridge 1 of a steering wheel L is entirely sufficient. However, problems with regard to the strength and reliability of the connection described may occur if, in the event of a crash, the airbag module is triggered, i.e. the gas generator G is ignited to inflate an associated airbag. In this case, the recoil forces occurring during the inflation of the airbag cause the airbag module 2 to move with respect to the contact bridge 1 in the introductory direction E (axial direction of the latching openings 3), so that the expanding section 41a, 41b of the respective expanding element 4 grasps the associated securing element 5, the latter penetrating a distance into the slot or gap 42 of the expanding element 3.

Under the action of the elastic elements 6, which serve as restoring springs and are in the form of helical springs, the airbag module 2 is then moved with respect to the contact bridge 1 counter to the introductory direction E in such a manner that the expanding elements 4 pass again into their latching position. In this case, they take along the respectively associated securing element 5, since the latter can be released from the contact bridge 1 owing to its releasable connection therewith (via a predetermined breaking point). The respective securing element 5 then remains in the central gap 42 of the associated expanding element 4 and holds the latter in the expanded state during the crash by engaging with its expanding section 41a, 41b behind the edge 31 of the latching opening 3. Therefore, in the event of great crash forces occurring, a sufficiently secure connection of airbag module 2 and steering wheel L is ensured at the connecting points 3, 4.

In the case of all of the motor vehicles in which a crash leading to the airbag module 2 being triggered does not occur during operation, during the entire operating period the airbag module 2 remains secured to the steering wheel L or to the contact bridge 1 of the steering wheel L by means of expanding elements 4 and associated latching openings 3 without the use of securing elements 5. The corresponding connections can therefore be disassembled very easily by the latching elements 4 being compressed radially inward at their latching sections 41a, 41b and then being pulled out of the associated latching openings 34.

Furthermore, FIGS. 1 and 2 show mutually assigned (electric) contact elements K1 and K2 of the contact bridge 1, on the one hand, and of the airbag module 2 or module housing 20, 25 on the other hand, which contact elements can be brought into contact with one another by force being applied to the covering cap 25 of the module housing 20, 25 of the airbag module 2 (counter to the action of the helical spring 6), as a result of which a signal horn can be electrically triggered.

Figure 3:
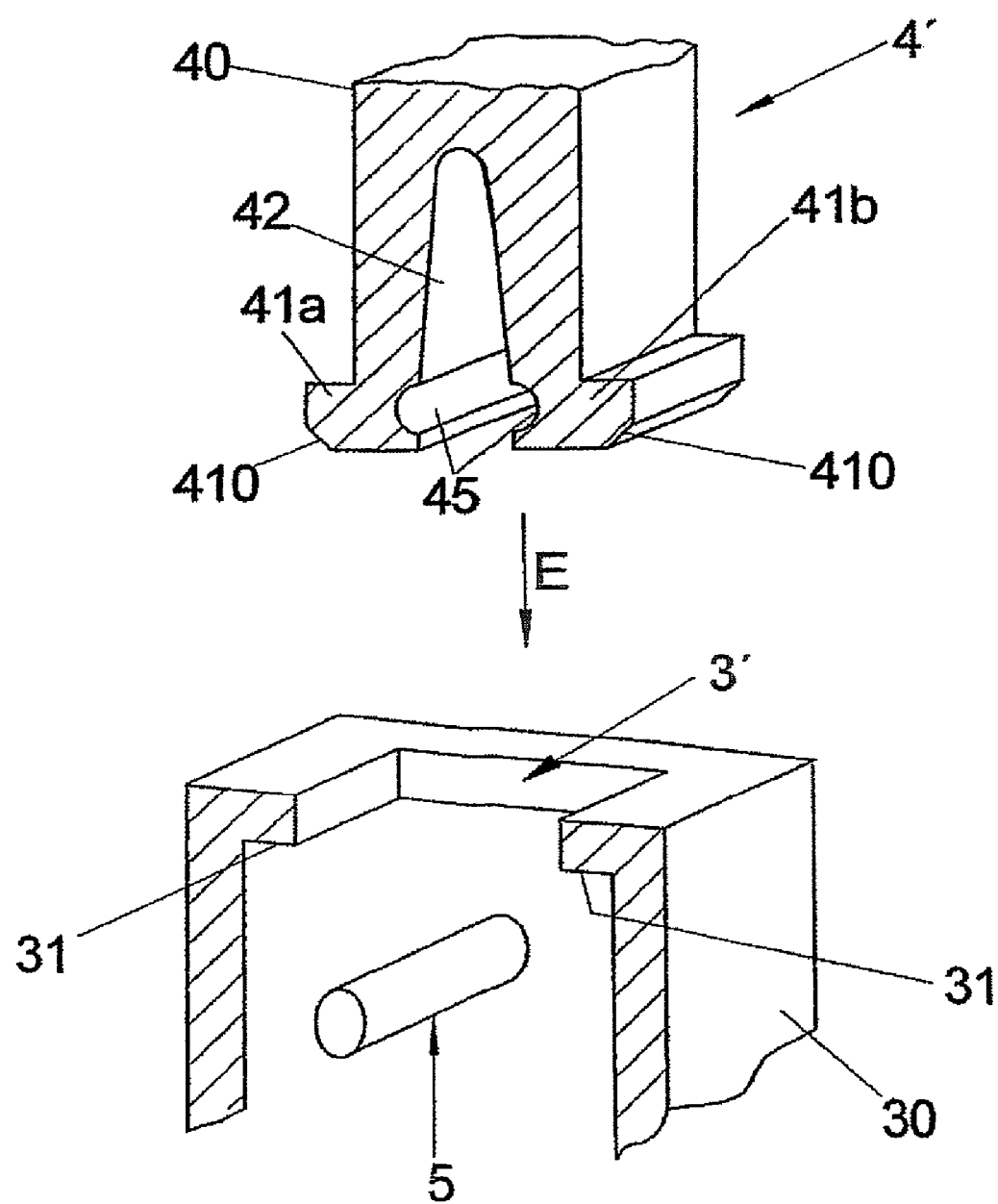
FIG. 3 shows a diagrammatically perspective illustration of a possible embodiment of connecting means for connecting the airbag module to the contact bridge.

FIG. 3 shows, diagrammatically in a perspective illustration, a further exemplary embodiment of an expanding element 4' and of an associated latching opening 3' which can be used in the case of a connecting device of the type illustrated in FIGS. 1 and 2.

The expanding element 4' has a stem 40 and an expanding section 41a, 41b, formed by two hooks separated from each other by means of a gap 42, with it being possible for the expanding section 41, 41b to be compressed inward with the gap width being reduced. At its lower end in the introductory direction, the expanding section 41a, 41b is provided with introductory slopes 410 in order to facilitate the introduction into a latching opening 3', which is formed on a latching body 30, with deformation (radial compression) of the expanding section 41a, 41b.

Arranged behind the edge 31 of the latching opening 3' in the introductory direction E is a securing element 5 in the form of a securing pin which can be grasped by a form-fitting region 45, which is formed by an undercut contour, of the expanding element 4' when the latter is moved in the introductory direction E beyond the latching position, in which it bears with its expanding section 41a, 41b against the edge 31 of the latching opening 3'.

Figure 4C:
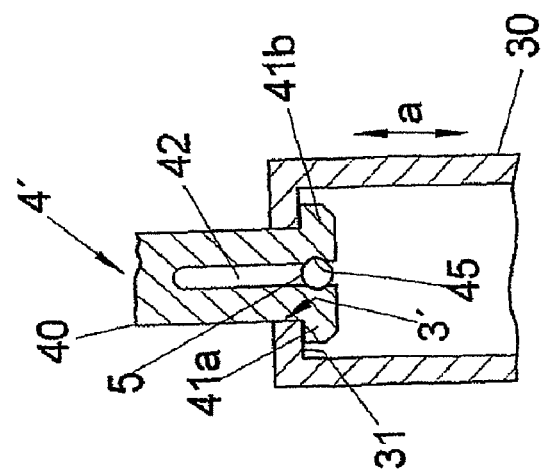
FIGS. 4a-4c show different states of a connecting point according to FIG. 3.
Figure 4B:
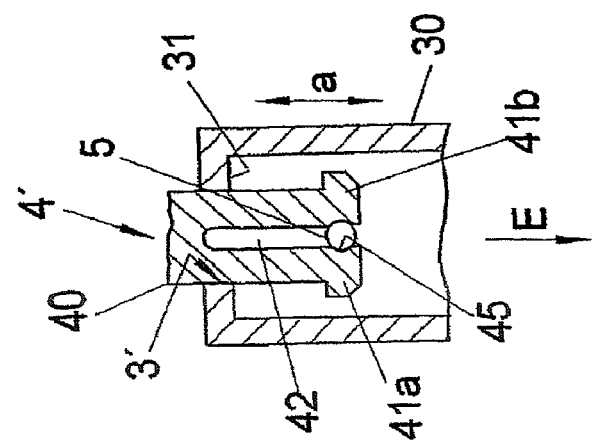
Figure 4A:
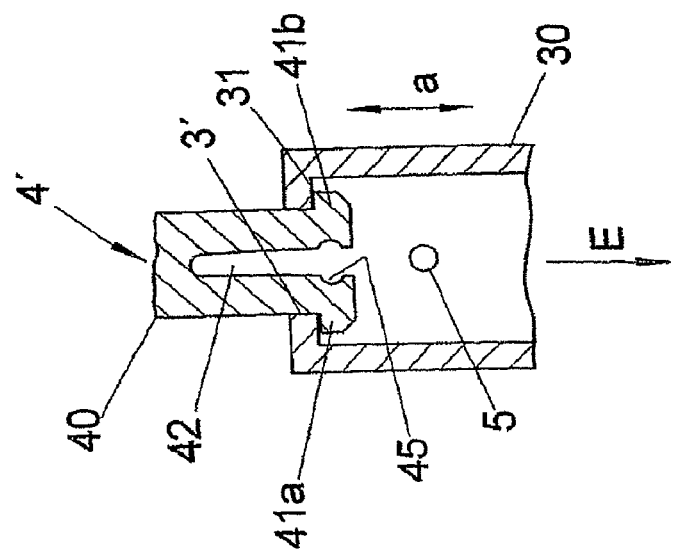

FIG. 4a shows, in a cross section, the arrangement from FIG. 3 in the latching position of the expanding element 4' in which the latter bears with its latching section 41a, 41b against the edge 31 of the latching opening 3' of the latching body 30.

FIG. 4b shows the arrangement in a state in which (caused by a crash, as a consequence of the recoil occurring when the airbag module is triggered) the expanding element 4 has been moved in the introductory direction E (axial direction a) beyond the latching position until, by means of its form-fitting region 45, it grasps the securing element 5. To this end, it is necessary for the stem 40 of the expanding element 4' to be of sufficiently greater length (extending in the introductory direction E or axial direction a) than the latching opening 3', so that the expanding element 4' can take up different longitudinal positions with respect to the latching opening 3'.

The expanding element 4' subsequently moves back into its latching position, for example under the action of a restoring spring 6, as illustrated in FIG. 2, with, according to FIG. 4c, the securing element 5 being taken along in the form-fitting region 45 of the expanding section 41a, 41b after it has been released from the corresponding subassembly of the steering wheel (contact bridge 1, compare FIG. 2), to which it was releasably fastened. In the state shown in FIG. 4c, the expanding element 4' is then secured in its latching position by being held permanently in the expanded state by means of the securing element 5 held in the form-fitting region 45. There is then no risk that it could be compressed under the action of particularly great forces and could slide through the latching opening 3', with the consequence that the airbag module 2 would no longer be reliably fastened to the steering wheel L.

FIG. 5 shows a typical force profile F as a function of the time t (in milliseconds) at a connecting point of the type illustrated in FIGS. 1 to 4c after a crash event has occurred.

At the time t=0, a crash, i.e. a particularly sharp deceleration of the corresponding motor vehicle, is detected and the airbag module is triggered, i.e. the gas generator for inflating the airbag provided in the airbag module is ignited. After less than 10 milliseconds a first force peak X occurs which represents the force exerted on the contact bridge 1 (compare FIG. 2) by the airbag module 2 via the spring 6 due to the recoil caused by the gas generator. This force causes the displacement of the airbag module 2 with respect to the contact bridge 1 with the helical spring 6 being deformed, with the consequence that the expanding elements 4' (as illustrated in FIG. 4b) can in each case grasp an associated securing element 5. A second force peak Y acting in the opposite direction shows the tensile force acting on the airbag module 2 in the opposite direction after somewhat more than 10 milliseconds, the tensile force causing the expanding elements 4' to return into their respective latching positions.

Figure 6A:
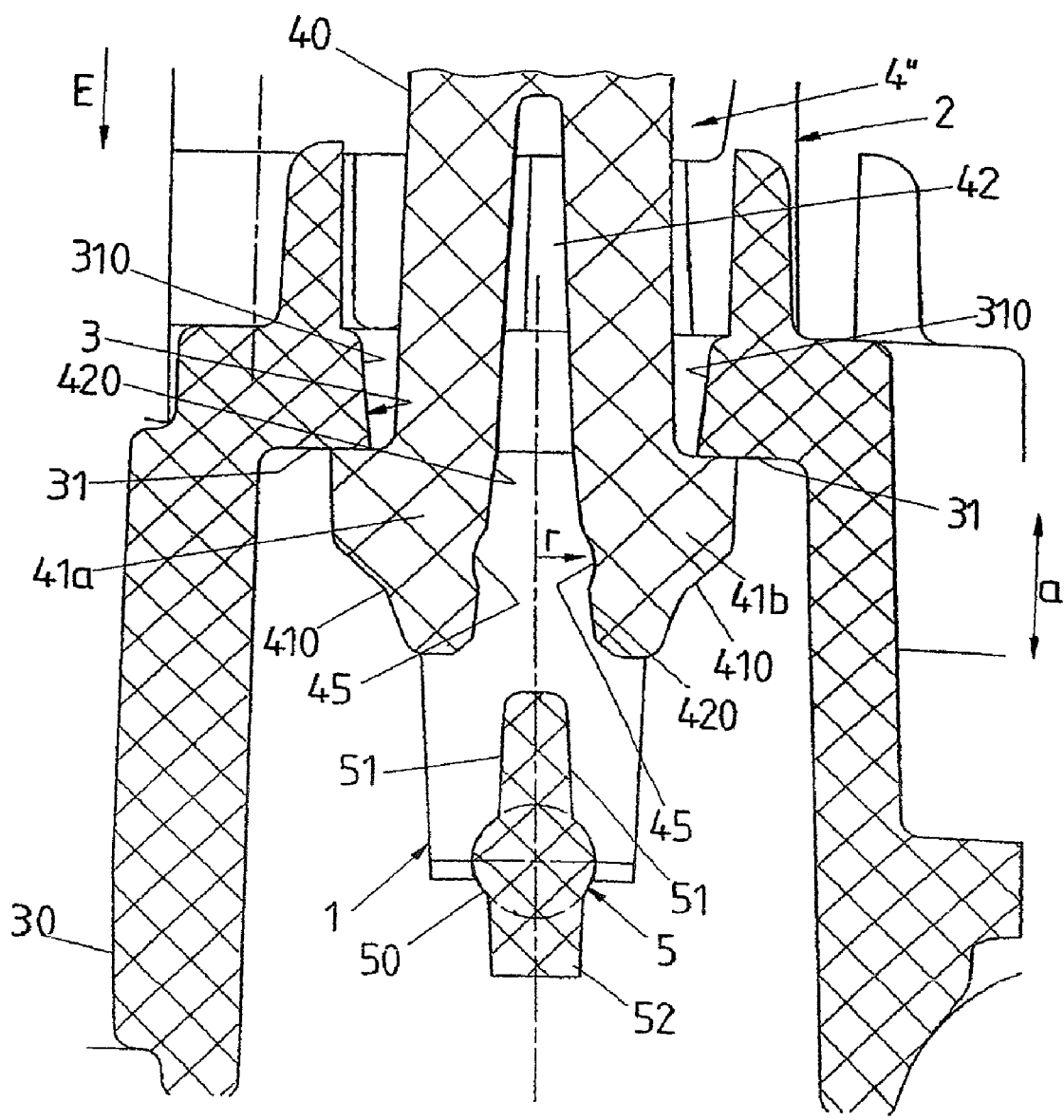
FIGS. 6a and 6b show a further embodiment of a connecting point for an arrangement according to FIGS. 1 and 2.

FIG. 6a shows a development of a connecting point which is formed by a latching opening 3 and an expanding element 4", the expanding element 4" being in its latching position in the state according to FIG. 6a, i.e. bearing with its expanding section 41a, 41b, which is formed by two latching hooks (arranged on both sides of a gap 42), against the edge 31 of the latching opening 30 and engaging behind said edge.

Arranged behind the latching opening and spaced apart in the introductory direction E or axial direction a from the expanding section 41a, 41b, which is in its latching position, is a securing element 5 which is connected releasably to a component of the contact bridge 1, is designed as a securing pin and, on its side facing the latching section 41a, 41b (in the latching position), has a guide section tapering conically to the latching section 41a, 41b. Said guide section is assigned corresponding side walls 420, which have a conical profile, of the gap 42 of the expanding element 4" in order to facilitate the introduction of the securing element 5 into the form-fitting region 45 of the expanding element 4". On its side facing away from the expanding section 41a, 41b, which is in the latching position, the securing element 5 furthermore has a supporting section 52 protruding from its cylindrical surface.

With reference to FIG. 6*a*, it is furthermore clear that the expanding section 41*a*, 41*b* of the expanding element 4" has, on its lower, outer edge, introductory slopes 410 which interact with corresponding introductory slopes 310 of the latching opening 3 in order to facilitate the introduction of the expanding element 4" with its expanding section 41*a*, 41*b* into the latching opening 3 in the introductory direction E during assembly of the airbag module 2 and the contact bridge 1. In this case, the expanding section 41*a*, 41*b* of the expanding element 4" is deformed inward counter to the radial r and compressed in the above-described manner under constriction of the gap 42 until it expands again when the latching position illustrated in FIG. 6*a* is reached.

Figure 6B:
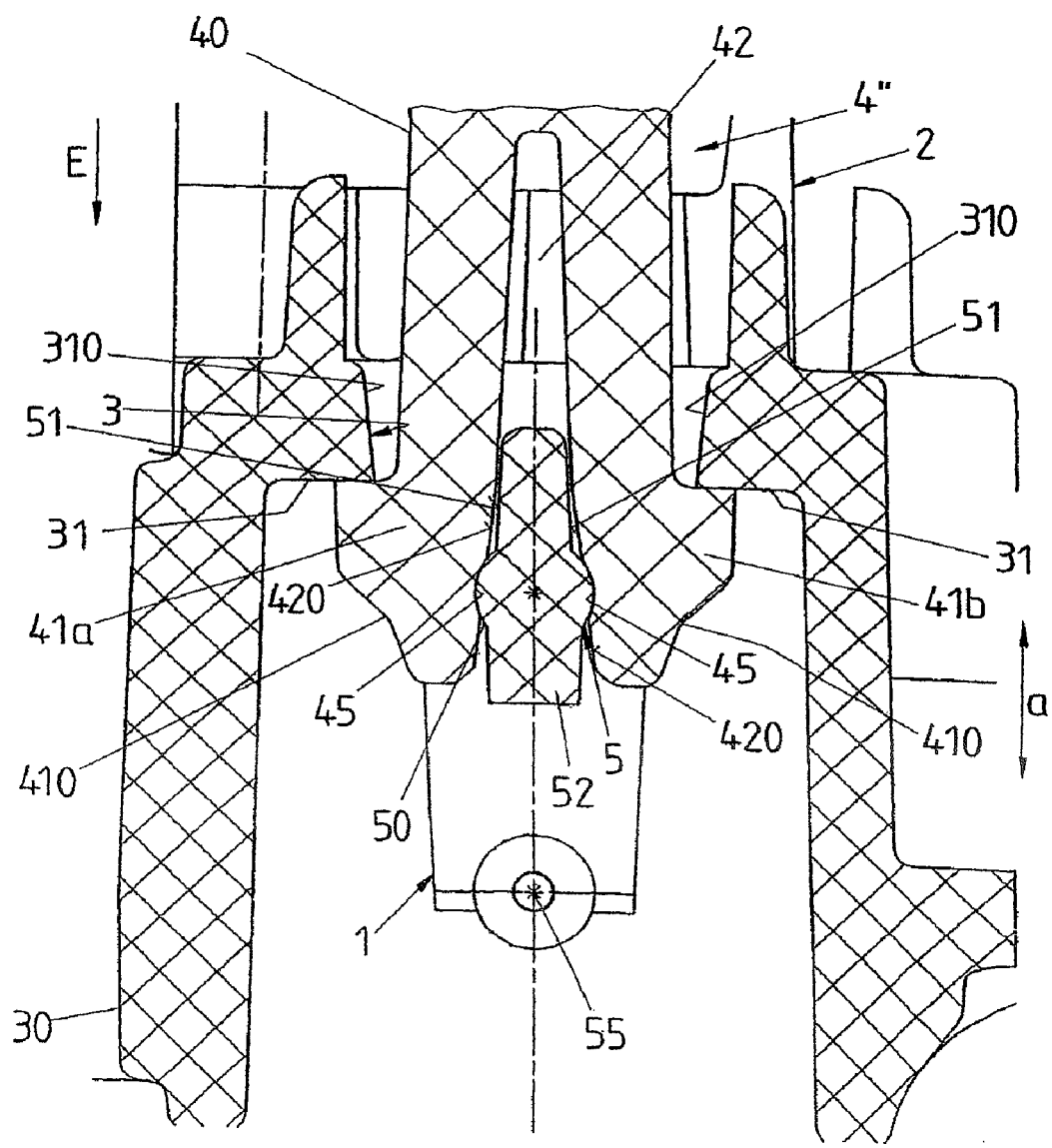

FIG. 6*b* shows the connecting point from FIG. 6*a* with the expanding element 4" again in its latching position, but the securing element 5 being held in the form-fitting region 45 of the expanding element 4". Said securing element presses the two hooks of the expanding section 41*a*, 41*b* apart in such a manner and thereby widens the expanding section 41*a*, 41*b* in such a manner that the latter is held permanently in the expanded state in which it engages behind the edge 31 of the latching opening 3. Put another way, the securing element 5 when it is situated in the form-fitting element 45 of the expanding element 4" opposes a radial compression of the expanding section 41*a*, 41*b*, with the result that the latter cannot pass through the latching opening 3. It is thereby avoided that the connection could become loose when particularly great forces occur.

The transition from the state of the connecting point that is shown in FIG. 6*a* into the state shown in FIG. 6*b* takes place in such a manner that (utilizing the length of the stem 40 of the expanding element 4" in the axial direction a or introductory direction E, which length is larger than the extent of the latching opening 3 along this direction a or E) the expanding element 4 is displaced in the introductory direction E beyond its latching position until, by means of its form-fitting region 45, which is formed in the gap or slot 42 and defines an undercut contour, it grasps the cylindrical basic body 50 (securing pin) of the securing element 5. In this connection, the introduction of the securing element 5 into the gap 42 and finally into the form-fitting region 45 of the expanding element 4" is facilitated by the interacting guide sections 410, 51 of the expanding element 4" and of the securing element 5.

FIG. 6*b* also shows the predetermined breaking point 55 at which the securing element 5 has been released from the associated component of the contact bridge 1 after being grasped by the form-fitting region 45 of the expanding element 4".

The connecting point illustrated in FIGS. 6*a* and 6*b* can also be configured in such a manner that the grasping of the securing element 5 by the form-fitting region 45 of the expanding element 4" is only caused in the event of a crash, in particular under the action of the recoil generated by the gas generator of the airbag arrangement. On the other hand, it may also be provided that the transfer of the expanding element 4" from the state shown in FIG. 4*a*, in which it is in its latching position in the expanded state, but without securing element, into the state shown in FIG. 6*b* takes place at a certain time during the installation of the subassemblies to be connected to each other (contact bridge 1 and airbag module 2), the expanded state of the expanding section 41*a*, 41*b* being held in the last-mentioned state by the securing element 5, so that the expanding section 41*a*, 41*b* cannot be guided out of its latching position through the latching opening 3.

It can therefore be provided, for example, that the two subassemblies to be connected to each other are first of all assembled in such a manner that the respective connecting points are in the state shown in FIG. 6*a*, in which the expanding element 4" is in its latching position without the securing element 5, in which latching position it engages with the latching section 41*a*, 41*b* behind the edge 31 of the latching opening 3. At a later time, for example when the corresponding steering wheel and the associated airbag module are installed in a motor vehicle, the securing of the connecting points can take place by the expanding element 4" being transferred, by grasping the securing element 5, into the state illustrated in FIG. 6*b*, in which the expanded state of the expanding section 41*a*, 41*b* is held by the securing element 5.

The securing of the expanded state of the expanding section 41*a*, 41*b* can therefore take place in a specific manner at a time at which the installation process has been finished to the extent that an unlocking of the connecting points no longer appears to be necessary. As an alternative, the bringing of the expanding element 4 into engagement with the securing element 5, which movement has already been described further above, can be provided in the event of a crash.

The arrangement illustrated in FIGS. 6*a* and 6*b* firstly has the advantage that the guide geometry assisting the introduction of the securing element 5 into the form-fitting section 45 of the expanding element 4" together with the guide surfaces 51 and the extension 52 and the associated inner surfaces 420 on the gap 42 of the expanding element 4" at the same time assists the expanding element on the latching plane in the absorption of shearing forces which may occur when subjected to a large load (in the event of a crash), so that an unlatching of the expanding element from its latching position is reliably prevented. Furthermore, in all of the exemplary embodiments previously described, the fixed latching of the securing element 5 on the expanding element 4, 4', 4" avoids grinding noises when the signal horn is triggered.

Since the securing element which is connected releasably to an associated component, for example a component of the contact bridge 1, can be formed on the corresponding component by injection molding, the provision of the securing element 5 does not require any additional outlay and, in particular, no additional, separate components, and so the logistic costs are minimized. The outlay on installation is also minimized, since the securing element 5 does not have to be introduced into the expanding element 4, 4', 4" as a separate component, but rather is held ready from the start behind latching opening 3 as a component of one of the subassemblies to be connected (contact bridge 1). In this connection, in particular, a suitable pairing of material with the expanding element 4, 4', 4" is also possible.

What is claimed is:

1. A device for connection of two subassemblies including an airbag module for being connected to a supporting vehicle component, with
    an expanding element which is arranged on one of the subassemblies to be connected,
    a latching opening which is provided on another of the subassemblies to be connected and into which the expanding element can be introduced in such a manner that, in a latching position in an expanded state, it engages behind the edge of the latching opening, and a securing element which can be brought into engagement with the expanding element in such a manner that it holds the expanding element in the expanded state, characterized in that, before being brought into engagement with the expanding element, the securing element is connected releasably to a different component from the subassembly provided with the expanding element and is arranged behind the latching opening in such a manner that it can be brought into engagement with the expanding element when the expanding element is guided beyond its latching position through the latching opening, characterized in that the expanding element has a stem and an expanding section, the stem reaching through the latching opening, after the expanding element is introduced into the latching opening until it reaches the latching position, and the expanding section engaging behind an edge of the latching opening, and the stem of the expanding element is of such a length in a direction of extent of the latching opening that the expanding element can be brought with respect to the latching opening into an engagement position, in which the stem reaches through the latching opening and the expanding section is spaced apart from the edge of the latching opening.

2. The device as claimed in claim 1, characterized in that the expanding element, when introduced into the latching opening, can be brought into a first position which is referred to as the latching position and in which it engages behind an edge of the latching opening, and in that the expanding element can be brought beyond the latching position into a second position, which is referred to as the engagement position and in which it enters into engagement with the securing element.

3. The device as claimed in claim 1, characterized in that the length of the stem of the expanding element along the direction of extent of the latching opening is greater than the extent of the latching opening along this direction.

4. The device as claimed in claim 1, characterized in that the two subassemblies to be connected are braced elastically against each other in such a manner that the expanding element has the tendency, after being introduced into the latching opening, of taking up the latching position.

5. The device as claimed in claim 4, characterized in that the two subassemblies are braced against each other by means of at least one elastic element, in particular in the form of at least one spring.

6. The device as claimed in claim 5, characterized in that the spring element engages around the stem of the expanding element.

7. The device as claimed in claim 1, characterized in that the two subassemblies to be connected are formed by an airbag subassembly and a steering wheel subassembly.

8. The device as claimed in claim 7, characterized in that the airbag subassembly is formed by a housing of an airbag module or by a component thereof.

9. The device as claimed in claims 8, characterized in that a signal horn can be triggered by a movement of the airbag subassembly relative to the steering wheel subassembly.

10. The device as claimed in claim 9, characterized in that the airbag subassembly moves counter to the action of an elastic element.

11. The device as claimed in claim 7, characterized in that the steering wheel subassembly is formed by a contact bridge of a steering wheel with a signal horn function.

12. The device as claimed in claim 1, characterized in that the expanding element can be brought into engagement with the securing element by means of a relative movement of the two subassemblies to be connected such that the expanding element grasps the securing element.

13. A device for connection of two subassemblies including an airbag module for being connected to a supporting vehicle component, with an expanding element which is arranged on one of the subassemblies to be connected, a latching opening which is provided on another of the subassemblies to be connected and into which the expanding element can be introduced in such a manner that, in a latching position in an expanded state, it engages behind the edge of the latching opening, and a securing element which can be brought into engagement with the expanding element in such a manner that it holds the expanding element in the expanded state, characterized in that, before being brought into engagement with the expanding element, the securing element is connected releasably to a different component from the subassembly provided with the expanding element and is arranged behind the latching opening in such a manner that it can be brought into engagement with the expanding element when the expanding element is guided beyond its latching position through the latching opening, characterized in that the expanding element can be brought into engagement with the securing element by means of a relative movement of the two subassemblies to be connected such that the expanding element grasps the securing element, and the relative movement takes place counter to a bias force provided by an elastic element.

14. The device as claimed in claim 13, characterized in that the expanding element has a stem and an expanding section, the stem reaching through the latching opening, after the expanding element is introduced into the latching opening until it reaches the latching position, and the expanding section engaging behind an edge of the latching opening.

15. The device as claimed in claim 13, characterized in that the expanding element can be introduced into the latching opening by a relative movement of the two subassemblies, which are to be connected, along an introductory direction.

16. The device as claimed in claim 13, characterized in that the grasping of the securing element by the expanding element is brought about by a recoil which is caused by an associated gas generator when an airbag of the airbag module is inflated.

17. The device as claimed in claim 13, characterized in that, when the two subassemblies to be connected to each other are assembled, the securing element can be brought into engagement with the expanding element.

18. The device as claimed in claim 13, characterized in that the securing element is connected releasably to the other subassembly provided with the latching opening.

19. A device for connection of two subassemblies including an airbag module for being connected to a supporting vehicle component, with an expanding element which is arranged on one of the subassemblies to be connected, a latching opening which is provided on another of the subassemblies to be connected and into which the expanding element can be introduced in such a manner that, in a latching position in an expanded state, it engages behind the edge of the latching opening, and a securing element which can be brought into engagement with the expanding element in such a manner that it holds the expanding element in the expanded state, characterized in that, before being brought into engagement with the expanding element, the securing element is connected releasably to a different component from the subassembly provided with the expanding element and is arranged behind the latching opening in such a manner that it can be brought into engagement with the expanding element when the expanding element is guided beyond its latching position through the latching opening, characterized in that the securing element is connected releasably to the component in such a manner that the securing element is detached from the associated component and remains in engagement with the expanding element when the expanding element is guided back into its latching position after grasping the securing element.

20. The device as claimed in claim 19, characterized in that the expanding element can be guided back into the latching position under the action of an elastic element.

21. The device as claimed in claim 19, characterized in that a predetermined breaking point is provided for the releasable connection of the securing element to the component.

22. The device as claimed in claim 19, characterized in that, for the releasable connection to the component, the securing element is formed thereon by injection molding.

23. The device as claimed in claim 19, characterized in that the expanding element has a form-fitting region, in particular in the form of a undercut contour, with which the securing element can be grasped in a form-fitting manner.

24. The device as claimed in claim 19, characterized in that a guide section for introducing the securing element into the expanding element is formed on the expanding element and/or on the securing element.

25. The device as claimed in claim 24, characterized in that the guide section has a conical profile at least in some sections.

26. The device as claimed in claim 19, characterized in that introducing slopes are provided on the latching opening and/or the expanding element in order to facilitate the introduction of the expanding element into the latching opening.

27. The device as claimed in claim 19, characterized in that the expanding section of the expanding element is designed elastically in such a manner that it can be compressed when the expanding element is introduced into the latching opening and widens again when the latching position is reached.

28. The device as claimed in claim 19, characterized in that the expanding element has an expanding section formed by at least two hook-shaped regions.

29. The device as claimed in claim 19, characterized in that the securing element comprises a cylindrical basic body.

30. The device as claimed in claim 19, characterized in that at least two latching openings and associated expanding elements are provided for the connection of the airbag module to the supporting vehicle component.

* * * * *